United States Patent [19]
Kuo et al.

[11] Patent Number: 5,334,638
[45] Date of Patent: Aug. 2, 1994

[54] AQUEOUS DISPERSION USEFUL IN COATINGS CONTAINING HYDROLYZED CELLULOSE ESTER AND ACYRLIC RESIN

[75] Inventors: Chung M. Kuo, Kingsport; Larry G. Curtis, Johnson City; Paul L. Lucas, Gray, all of Tenn.

[73] Assignee: Eastman Chemical Company, Kingsport, Tenn.

[21] Appl. No.: 823,507

[22] Filed: Jan. 21, 1992

[51] Int. Cl.$^5$ ............................................. C08L 1/14
[52] U.S. Cl. ................................. 524/40; 523/344; 524/502
[58] Field of Search .................. 524/40, 502; 523/344

[56] References Cited

U.S. PATENT DOCUMENTS

| | | | |
|---|---|---|---|
| T983,007 | 6/1979 | Leonard | 524/40 |
| 2,834,776 | 5/1958 | Malm et al. | 536/65 |
| 2,849,409 | 8/1958 | Evans | 524/40 |
| 3,154,506 | 10/1964 | Janssens | 427/384 |
| 3,220,865 | 11/1965 | Coney | 106/170 |
| 3,318,714 | 5/1967 | Coney et al. | 106/193 |
| 3,489,743 | 1/1970 | Crane | 536/164 |
| 3,634,347 | 1/1972 | Kao | 524/40 |
| 3,929,693 | 12/1975 | Hochberg | 524/40 |
| 3,932,191 | 1/1976 | Jerabek et al. | 106/178 |
| 4,011,388 | 3/1977 | Murphy et al. | 526/320 |
| 4,120,835 | 10/1978 | Goodell | 524/40 |
| 4,136,068 | 1/1979 | Nomura et al. | 525/54.3 |
| 4,177,172 | 12/1979 | Traencker et al. | 428/528 |
| 4,221,683 | 9/1980 | Nahate et al. | 524/40 X |
| 4,252,697 | 2/1981 | Hashizume et al. | 526/200 |
| 4,352,902 | 10/1982 | Nakayama et al. | 524/40 |
| 4,389,503 | 6/1983 | Maxwell et al. | 524/38 |
| 4,408,028 | 10/1983 | Nakayama et al. | 526/200 |
| 4,415,703 | 11/1983 | Toba et al. | 525/54.21 |
| 4,435,531 | 3/1984 | Nakayama et al. | 524/37 |
| 4,443,589 | 4/1984 | Tobias | 527/300 |
| 4,451,597 | 5/1984 | Victorius | 524/40 X |
| 4,521,565 | 6/1985 | Toaba et al. | 525/64 |
| 4,532,177 | 7/1985 | Mahar | 524/40 X |
| 4,590,265 | 5/1986 | Bogan et al. | 536/63 |
| 4,740,541 | 4/1988 | Morse | 524/40 |
| 4,960,814 | 10/1990 | Wu et al. | 524/312 |
| 4,970,247 | 11/1990 | Hoppe et al. | 524/40 X |
| 5,011,874 | 4/1991 | Hoppe et al. | 524/40 X |

FOREIGN PATENT DOCUMENTS

| | | |
|---|---|---|
| 0065279 | 5/1982 | European Pat. Off. . |
| 138703 | 7/1989 | European Pat. Off. . |
| 2436614 | 2/1976 | Fed. Rep. of Germany . |
| 2702986 | 7/1978 | Fed. Rep. of Germany . |
| 3321180 | 12/1984 | Fed. Rep. of Germany . |

OTHER PUBLICATIONS

"Cellulose Derivatives", Part II, 2nd Edition Interscience, New York, 1954, pp. 763–824.
Derwent Abstract, JP 55120613, 1980.
Derwent Abstract, JP 57153014, 1982.
Derwent Abstract, JP 58210966, 1983.
Research Disclosure Number 23917, Mar., 1984.
Derwent Abstract, JP 60195172, 1985.
Derwent Abstract, JP 86044901; 1986.
Research Disclosure Number 28323, Nov., 1987.
Derwent Abstract JP 88001965, 1988.
Derwent Abstract JP 2185578, 1990.

*Primary Examiner*—Judy M. Reddick
*Attorney, Agent, or Firm*—Mark A. Montgomery

[57] ABSTRACT

A stable aqueous dispersion and process for making the dispersion are provided containing hydrolyzed cellulose ester, organic solvent, water and acrylic resin having free acid functionalities that are at least partially neutralized. The dispersion is useful in coatings and can also contain surfactant and cross-linking agent.

12 Claims, No Drawings ic resins. More particularly the present invention relates to aqueous dispersions that are stable over long periods of time containing a hydrolyzed cellulose ester and an acrylic resin that has free acid functionalities that are at least partially neutralized.

AQUEOUS DISPERSION USEFUL IN COATINGS CONTAINING HYDROLYZED CELLULOSE ESTER AND ACYRLIC RESIN

FIELD OF THE INVENTION

The present invention relates to novel coating compositions containing hydrolyzed cellulose esters and acrylic resins. More particularly the present invention relates to aqueous dispersions that are stable over long periods of time containing a hydrolyzed cellulose ester and an acrylic resin that has free acid functionalities that are at least partially neutralized.

BACKGROUND OF THE INVENTION

Cellulose esters are valuable polymers which are useful in many plastic, film, coating and fiber applications. In coatings applications, cellulose esters are generally applied from organic solvent solutions. Because of health and environmental concerns from volatile organic content (VOC) of solvent based coatings, water based coatings are becoming more in demand. There are waterborne coating formulation available containing polyesters and acrylics, but few contain cellulose esters due to their hydrophobic nature making them difficult to disperse or emulsify. When applied from organic solvent solutions as wood, leather, and metal coatings, cellulose esters impart desired properties such as, improved pigment dispersions, improved metallic flake orientation, improved solvent release, and higher gloss coatings. Cellulose esters also function as an excellent rheology control agent in solvent coating formulations. It would be very desirable to incorporate these excellent properties of cellulose esters into waterborne coating systems.

Previous attempts to produce a water dispersible cellulose ester coatings system have involved oxidation of cellulose ester, grafting of acrylic acid to cellulose esters, and reaction of anhydrides such as phthalic anhydride or succinic anhydride with the hydrolyzed cellulose esters to provide modified cellulose esters containing free carboxyl groups such as disclosed in the following U.S. Patents; U.S. Pat. No. 4,435,531; U.S. Pat. No. 4,590,265; U.S. Pat. No. 4,960,814; U.S. Pat. No. 4,252,697. However, these processes are complicated resulting in expensive aqueous dispersion. It would, therefore, be very desirable to be able to easily produce aqueous dispersions containing unmodified cellulose esters.

Other cellulose ester systems used in water based coating are disclosed in U.S. Pat. No. 3,318,714 (describing pigment dispersions in a cellulose acetate butyrate lacquer systems) and U.S. Pat. No. 3,220,865 (describing an emulsion coating composition based on cellulose acetate butyrate, and plasticizers).

In addition to low VOC, stability of the dispersion is an important feature for these aqueous dispersions to be useful in coatings applications. Many aqueous dispersions, including those of low VOC, are not able to be stored for long periods of time without constant stirring. It would, therefore, be very desirable to be able to produce stable aqueous dispersions of cellulose esters, particularly ones that are stable over long periods of time. It is even more desirable to be able to produce stable aqueous dispersions that are low in VOC.

SUMMARY OF THE INVENTION

The dispersion composition of the present invention comprises:
 (a) 3 to 50 weight percent, hydrolyzed cellulose ester based on total solids,
 (b) about 5 to 95 weight percent acrylic resin, based on total solids, having free acid functionality that is at least partially neutralized;
 (c) about 0 to 10 weight percent surfactant based on total solids;
 (d) about 50 to 200 parts organic solvent per 100 parts hydrolyzed cellulose ester; and
 (e) an amount of water to render the dispersion usable in coating applications;
wherein the total solids content (a), (b), and (c) is about 10 to 50 weight percent.

The process for producing the aqueous dispersion according to the present invention comprises:
 (1) dissolving 100 parts hydrolyzed cellulose ester in 50 to 200 parts of a suitable organic solvent to form a solution, wherein the final amount of hydrolyzed cellulose ester is about 3 to 50 weight percent of the total solids; and
 (2) vigorously mixing water into said solution to form a dispersion wherein the mixing and amount of water are sufficient to render the dispersion usable in coating applications;
wherein about 0 to 10 weight percent surfactant, based on total solids, is present in the solution prior to step (2) and about 5 to 95 weight percent acrylic resin, based on total solids, is present in the dispersion having free acid functionality that is at least partially neutralized prior to contacting with water.

DETAILED DESCRIPTION OF THE INVENTION

Applicants have discovered inexpensive aqueous dispersions containing hydrolyzed cellulose esters and acrylic resins that are relatively stable over long periods of time. Additionally, the applicants have discovered that these aqueous dispersions containing hydrolyzed cellulose esters and acrylic resins provide excellent coatings for many substrates such as metal, wood, plastics, etc.

The dispersion compositions of the present invention generally have from 3 to 50 weight percent hydrolyzed cellulose ester, based on the total solids. The amount of hydrolyzed cellulose ester is preferably about 5 to 30 weight percent with an amount of about 10 to 20 weight percent being most preferred. An adequate amount of hydrolyzed ester is required to result in a dispersion that has good stability and good film forming ability. Adequate amounts of hydrolyzed cellulose ester also increase the drying characteristics and improve the gloss of the final coating. Thus amounts of hydrolyzed cellulose ester below about 3 weight percent based on total solids do not significantly improve the quality of the dispersion whereas amounts much over 50 weight percent based on the total solids reduce the amount of acrylic resin present lowering the strength and hardness of the resulting dried and/or cured coating.

Applicants have discovered that the hydroxyl content contributes to the solubility/dispersability of the hydrolyzed cellulose ester and contributes to the overall stability of the dispersion. The unsubstituted hydroxyl content of the hydrolyzed cellulose ester is generally within the range of 0.5 to 25 weight percent preferably about 1 to 15 weight percent based on the unit molecular weight of the hydrolyzed cellulose ester (unit molecular weight means the molecular weight of an anhydroglucose unit of a cellulose ester containing the appropriate acyl substituents). However, the hydrolyzed cellulose ester more preferably has a relatively high hydroxyl content. Hydrolyzed cellulose esters having a hydroxyl content greater than 3 unit molecular weight percent provide improved solubility and stability to the resulting dispersion. Higher unsubstituted hydroxyl content in the hydrolyzed cellulose ester are better in that the resulting dispersion is more stable. The most preferred hydroxyl content is between about 6 and 9 weight percent. The higher amounts are preferred, however amounts much over about 9 weight percent are impractical due to cost, longer reaction times, and yield.

Hydrolyzed cellulose esters having good solubility in common organic solvents can be prepared as generally disclosed in U.S. Pat. No. 2,834,776. Applicants have discovered that hydrolyzed cellulose esters having higher unit hydroxyl contents provide more stable aqueous dispersions. The higher unit hydroxyl content can be prepared by increasing the hydrolysis residence time thereby increasing the final unit hydroxyl content.

The preparation of cellulose esters or mixed esters of cellulose such as cellulose acetate butyrate (CAB), cellulose acetate propionate (CAP) etc. are known (C. J. Malm, G. D. Hiatt in E. Ott, H. M. Spurlin, and M. W. Graffin, Ed., cellulose derivatives, Part II, 2nd Edition Interscience, New York, 1954, PP.763-824). Examples of suitable cellulose esters include CAP, CAB, cellulose acetate valerate (CAV), cellulose acetate isovalerate (CAIV), cellulose acetate propionate butyrate (CAPB), and the like, with CAB being most preferred. The CAB preferably has a butyryl content of 17 to 57 unit molecular weight percent, more preferably 25 to 55, with a butyryl unit molecular weight percent content of about 35 to 50 being most preferred. The higher butyryl contents are better, however amounts much over 50 unit molecular weight percent begin to reduce the content of the hydroxyl.

The CAB can have various degrees of acetylation and the amount of acetyl can be about 0 to 34 unit molecular weight percent depending on what remains after hydrolysis. However, this amount of acetyl is preferably about 0.5 to 16, more preferably 0.5 to 7 unit molecular weight percent with an amount below 2 unit molecular weight percent being most preferred. Lower amounts of acetyl are preferred due to the desirability of having higher amounts of butyryl and hydroxyl, however amounts below 0.5 percent are difficult to obtain.

A most preferred example of CAB used in the present invention is CAB-555-0.04 available from Eastman Chemical Company (ECC). In this example of CAB the first two digits represent the degree of butyryl group content in unit molecular weight percent before hydrolysis (after hydrolysis the butyryl content is generally below 50 percent), and the third digit represents the number of hydroxyl groups per four anhydroglucose units in the cellulose ester molecule. The number after the second hyphen indicates the viscosity in seconds measured by the method described in ASTM-D-1343-54T.

The molecular weight of the cellulose esters used in the present invention preferably ranges from about 10,000 to 80,000 polystyrene equivalents as determined by gel-permeation-chromatography method. The molecular weight is more preferably about 10,000 to 30,000 with a molecular weight of about 10,000 to 20,000 being most preferred.

The aqueous dispersion composition of the present invention has a acrylic resin content of about 5 to 95 wt. % based on the total weight of solids. This amount of acrylic resin is preferably about 30 to 70 weight percent with an amount of about 40 to 60 weight percent being most preferred. Suitable examples of acrylic resins that are useful in the present invention are copolymers containing acrylic acid, methacrylic acid, hydroxyethylmethacrylate, and the like, including vinyl monomers thereof. The acrylic resins used in the dispersion composition of the present invention have free acid functionalities. However, these free acid functionalities are at least partially neutralized in the final dispersion composition. The acrylic resins are partially neutralized to be able to form ionic dispersions in the resulting dispersion composition. Acrylic resins preferably have an acid number prior to partial neutralization of about 10 to 80, more preferably about 40 to 60 with an acid number of about 50 to 60 being the most preferred. The acrylic resins are preferably neutralized by 5 to 100 %, preferably 10 to 80 % with a neutralization percent of about 10 to 30 being most preferred. The acrylic resins are preferably neutralized using amines. Suitable amines include diethylaminoethanol, dimethylaminoethanol, N,N-dimethylethylamine, 2-dimethylamino-2-methyl-1-propanol, triethylamine, and the like, with dimethylaminoethanol being most preferred due to availability and effectiveness.

The amount of surfactant used in the present invention is about 0 to 10 wt. %, based on the total solids. The amount of surfactant used in the present invention is preferably at least 0.1 weight percent, more preferably about 1 to 8 weight percent, with a surfactant content of about 3 to 5 weight percent, based on total solids, being most preferred. Surfactants used in the present invention include ionic and nonionic surfactants. The ionic surfactants include anionic and cationic surfactants which are well known in the art. The more preferred surfactants are the nonionic surfactants. Suitable examples of nonionic surfactants include ethoxylated mono- and polyhydric alcohols and ethylene oxide/propylene oxide block copolymers.

A cross-linking agent can also be included in the dispersion of the present invention to improve the coating properties of the final cured coating such as film toughness, scratch resistance, water resistance, and solvent resistance. The preferred cross-linking agents used in the aqueous dispersions of the present invention include methylolated urea and triazine derivatives, and expoxide and formaldehyde-containing compounds, more preferably methylolated cyclic urea and aminotriazine compounds, with Cymel 373(a melamine cross-linking agent produced by American Cyanamid Company) being most preferred. The preferred cross-linking agent concentrations are about 5 to 60 weight percent, more preferably about 20 to 50 weight percent, with about 30 to 40 weight percent, based on the solids content of the dispersion being, the most preferred.

The amount of organic solvent and any cosolvent used in the dispersion composition of the present invention is about 50–200 parts organic solvent per 100 parts hydrolyzed cellulose ester, preferably about 50 to 150 parts, more preferably a concentration of 50 to 100 parts organic solvent per 100 parts hydrolyzed cellulose ester. In certain instances, it is desirable to include a cosolvent with the solvent to form a mixture of solvent and cosolvent. The amount of cosolvent is preferably about 10 to 80 parts, more preferably about 20 to 60 parts, with about 30 to 50 parts per 100 parts solvent or solvent mixture being most preferred. Suitable solvents include cyclohexanone, methylethylketone, acetone, methylamylketone, ethylacetate, propylacetate, butylacetate, ethylene glycol monobutylether, ethylene glycol monopropylether, ethylene glycol monoethylether, propylene glycol monomethylether and the like. The more preferred solvents are ethylene glycol monobutylether, cyclohexanone, methylethylketone and combinations of two or more of these solvents. Suitable cosolvents used include xylene, ethyl-3-ethoxypropionate, and alcohols such as 2-propanol, butanol, and 2-methyl-1-propanol.

The water content in the dispersion of the present invention depends upon the desired viscosity of the dispersion. The amount of water is the amount of water sufficient to render the dispersion usable in the particular coating application. This amount of water is generally within the range of about 100 to 300 parts, more preferably 100 to 200 parts, with about 100 to 150 parts per 100 parts of organic solvent being most preferred.

The overall total solids content of the dispersion composition of the present invention including hydrolyzed cellulose ester, acrylic resin, surfactant, and cross-linking agent is about 10 to 50 weight percent. The overall solids content, based on the total dispersion, is more preferably about 10 to 30 weight percent, with an overall solids content of about 15 to 25 weight percent being most preferred. The VOC is preferably low, below about 40 weight Percent, more preferably below 25 weight percent, with a low of below 20 weight percent being most preferred.

The aqueous dispersions of the present invention are prepared by the following process:

(1) dissolving 100 parts hydrolyzed cellulose ester in 50 to 200 parts of a suitable organic solvent to form a solution, (2) vigorously mixing water into the solution to form a dispersion wherein the mixing and amount of water are sufficient to render the dispersion usable in coating applications.

The acrylic resin can be present in the hydrolyzed cellulose ester/organic solvent solution prior to incorporation of the water, or the acrylic resin can be dispersed into the water prior to being introduced into the hydrolyzed cellulose ester organic solvent solution. The acrylic resin can be present in the solvent prior to introducing the hydrolyzed cellulose ester or it can be added after the hydrolyzed cellulose ester has been solubilized. However, the acrylic resin is preferably dissolved in the organic solvent after the addition of the hydrolyzed cellulose ester. Surfactant and cross-linking agent can be added at any point prior to the addition of the water to the hydrolyzed cellulose ester organic solvent solution but are preferably added while the hydrolyzed cellulose ester is being mixed into the organic solvent.

Other materials including conventional additives can be added to the dispersion of the present invention by conventional methods. Suitable examples of additives include polymer thermal stabilizers, UV stabilizers, antioxidants, colorants, carbon black, metal flake (including aluminum flake), and pigments. Preferred pigments include titanium dioxide, chromium oxide, chromium yellow, and cadmium red. The amount of pigments and additives depends upon each particular end-use application.

Common thermal stabilizers include epoxide-containing compounds such as glycidyl ether of aromatic hydrocarbons and, alcohols, for example, EPON 828, a Bisphenol-A type epoxy compound produced by Shell Chemical Company. Other suitable epoxide-containing compounds include epoxidized soybean oil or epoxidized tallate. Antioxidants generally used in the dispersion composition of the present invention include hindered phenol-type compounds, for example, 4-methyl-2,6-di-tert-butylphenol and tetrakis[methylene(3,5-di-tert-butyl-4-hydroxyhydrocinnamate)]methane (Irganox 1010 by Ciba-Geigy Corporation). Other compounds such as Tinuvin 770, a hindered amine, are also effective as antioxidants.

Ultraviolet stabilizers commonly used include 2,-(2'-hydroxyphenyl)benzotriazoles and 2-hydroxybenzophenones.

The dispersion of the present invention is preferably prepared at a temperature of about 25° to 100° C., more preferably about 25° to 60° C., with a temperature of about 25° to 40° C. being most preferred. The higher the temperature, the faster the dispersion will be formed, however, temperatures much above 100° C. are not very practical. The dispersion preparation time or mixing time is generally between 5 minutes and 2 hours, more preferably between 5 minutes and 50 minutes, with a time between about 20 and 30 minutes being most preferred. Times shorter than 5 minutes are possible but do not adequately form a homogeneous dispersion and times longer than 2 hours do not significantly increase the homogeneity of the dispersion. The preparation can be conducted at atmospheric pressure or pressurized. The dispersions can also be made either in batch or continuous operations.

The dispersions according to the present invention are generally low viscosity and milky in appearance. When coated on wood, metal, leather, and the like, they have good adhesion and dry to form clear, transparent films with good appearance and hardness.

The dispersion of the present invention can be applied to any suitable substrate by standard methods such as spraying, rolling, and brushing. Among the more useful substrates are metal, wood, leather, plastics, paper, fabrics, and glass.

After the aqueous dispersion of the present invention is applied to a suitable substrate, it is solidified by evaporation of the liquid component or other solidification methods known in the art of coatings and film forming. After solidification the coating can then be cured at elevated temperatures. The curing or drying temperature can vary depending upon the application but is preferably about 60° to 160° C., more preferably 90° to 150° C. with a curing temperature of about 110° to 150° C. being most preferred.

EXAMPLES

The following examples are to illustrate the present invention but are not intended to limit the reasonable scope thereof.

Example 1

In a 16 ounce wide mouth jar, 10.20 grams of CAB powder (CAB-555-0.04, from ECC having a ball drop viscosity of 0.04 sec.,an acetyl content of 0.30%, a butyryl content of 42.97%, a hydroxyl content of 7.64%, and a number average molecular weight of 17,000 in polystyrene equivalents as determined by gel permeatrion chromatography in N,N-dimethylformamide solvent) were dissolved by heating at 50° C. for 30 min. in 43.68 grams of Acryloid WR-97 from Rohm & Haas (a viscous liquid containing 70 weight percent acrylic resin, having an Acid #40, in a solvent mixture of isopropanol/ethylene glycol monobutylether) and 21.18 grams of Cymel 373 from American Cyanamid (a methylated melamine-formaldehyde resin which is 85% solids in water). Then 1.22 grams of Igepal CO-897 from Rhone-Poulenc (a nonionic surfactant containing 70% nonylphenoxypoly-(ethyleneoxy) ethanol in water, having an HLB of 17.8) were added to the solution and rapidly stirred using an Omni high shear mixer. The acid functionality of the acrylic resin was partially neutralized by adding 1.94 grams of 2-Dimethylaminoethanol (DMAE) forming a high viscosity solution. The viscosity was reduced by heating. High speed agitation was continued and 158.85 grams of demineralized water was added dropwise (~5 mL/min) to the solution. During water addition 1.20 grams of octyl alcohol was added to reduce foaming. As the water was added the dispersion remained viscous until the dispersion broke and water was continuously added until a low viscosity milky dispersion was obtained. This dispersion was stable for several weeks with any sedimentation being easily redispersed with gentle agitation.

A 10 mil wet film of the above dispersion was cast on a glass plate and dried overnight in a 55 degree centigrade oven. The resulting film was smooth and clear and it had good adhesion to the glass plate. When cured at 150 degrees centigrade, the film was clear, tough, solvent resistant, and scratch resistant.

Example 2

The procedure of Example 1 was repeated except that a CAB having a hydroxyl content of 9.1 % was used. The dispersion was more stable than the dispersion of Example 1 and the resulting cured film was clear, tough, solvent resistant, and scratch resistant.

Example 3

The procedure of Example 1 was repeated except that a CAB having a hydroxyl content of 11.2% was used. The dispersion was more stable than the dispersion of Example 1 and the resulting cured film was clear, tough solvent resistant, and scratch resistant.

Example 4

The procedure of Example 1 was repeated except that the Cymel 373 melamine component was omitted. A stable, low viscosity, milky dispersion was obtained. Films cast from this dispersion have good clarity and adhered well to glass plate on which they were cast but did not have as good solvent and scratch resistant as Example 1.

Example 5

The procedure of Example 1 was repeated except that an additional 10 grams of ethylene glycol monobutylether solvent was added and CAB-555-0.04 was substituted with CAB-551-0.01 (having an acetyl content of 2%, a butyryl content of 53%, a hydroxyl content of 1.5%, and a number average molecular weight of 16,000 in polystyrene equivalents as determined by gel permeation chromatography in tetrahydrofuran solvent). A low viscosity, milky dispersion was formed. When cast on glass plates, the resulting film had good clarity and adhesion but the dispersion was less stable than that of example 1.

Example 6

To a 16 ounce wide mouth jar were added 78.57 grams of Rohm & Haas Acryloid WR-97 and 0.5 gram of DMAE was stirred in. Then 35.29 grams of Cymel 373 was mixed in. This solution was then diluted with 4.0 grams of Ektasolve EB solvent (an ethylene glycol monobutylether from ECC), 3.5 grams of Ektasolve EP solvent (an ethylene glycol monopropylether from ECC) and 7.5 grams of Ektapro EEP solvent (an ethyl 3-ethoxypropionate from ECC). To this solution was then added 15 grams of CAB powder, CAB-555-0.04, used in Example 1. Then 5.0 grams of Igepal CO-897 was added. When a uniform solution was formed mixing was begun with a Silverson high shear mixer. The high speed agitation was continued and 149.86 grams of demineralized water was added dropwise (~5 mL/min) to the solution. As the water was added the dispersion remained viscous until the last 25-30% of the water was added. At this point, the viscosity of the dispersion broke and a low viscosity milky dispersion was obtained. This dispersion was stable for several weeks with any sedimentation being easily redispersed with gentle agitation.

A 10 mil wet film was cast on a glass plate and dried overnight in a 55 degree centigrade oven as in Example 1. The resultant film was smooth and clear and it had good adhesion to the glass plate. When cured at 150 degrees centigrade, the film was clear, tough, solvent resistant, and scratch resistant. Similarly good coating results were obtained using CAB's having hydroxyl contents below 3 weight percent except that the dispersions were not as stable.

The invention has been described in detail with particular reference to preferred embodiments thereof, but it will be understood that variations and modifications can be effected within the spirit and scope of the invention.

We claim:
1. An aqueous dispersion composition comprising:
   (a) about 3 to 50 weight percent, hydrolyzed cellulose ester based on total solids;
   (b) about 40 to 95 weight percent acrylic resin, based on total solids, having free acid functionality that is at least partially neutralized;
   (c) about 0 to 10 weight percent surfactant based on total solids;
   (d) about 50 to 200 parts organic solvent per 100 parts hydrolyzed cellulose ester; and
   (e) an amount of water to render the dispersion usable in coating applications;
   wherein said hydrolyzed cellulose ester has a hydroxyl content of at least 3 weight percent based on the unit molecular weight of the hydrolyzed cellulose ester and the content of (a), (b), and (c) in the total composition is about 10 to 50 weight percent.

2. The dispersion composition according to claim 1 containing about 0.1 to 10 weight percent surfactant.

3. The dispersion composition according to claim 2 wherein the total solids comprises 10 to 20 weight percent hydrolyzed cellulose ester, 40 to 60 weight percent acrylic resin, 1 to 8 weight percent surfactant selected from nonionic surfactants, and 30 to 40 weight percent crosslinking agent.

4. The dispersion composition according to claim 1 wherein said hydrolyzed cellulose ester has a hydroxyl content of at least 6 weight percent based on the unit molecular weight of the hydrolyzed cellulose ester and is selected from the group consisting of cellulose acetate butyrates, cellulose acetate propionates, cellulose acetate valerates, cellulose acetate isovalerates, and cellulose acetate propionate butyrates.

5. The dispersion composition according to claim 4 wherein said hydroxyl content is between 6 and 9 unit molecular weight percent.

6. The composition according to claim 4 wherein said hydrolyzed cellulose ester is a cellulose acetate butyrate.

7. The dispersion composition according to claim wherein said cellulose acetate butyrate has a butyryl content of about 35 to 50 unit molecular weight percent and an acetyl content of less than 2 unit molecular weight percent.

8. The dispersion composition according to claim 1 wherein said acrylic resin has an acid number of 40–60 prior to partial neutralization.

9. The dispersion composition according to claim 8 wherein said free acid functionality of said acrylic resin is 10 to 80 percent neutralized with base.

10. A process for producing an aqueous dispersion comprising:

(1) dissolving 100 parts hydrolyzed cellulose ester in 50 to 200 parts of an organic solvent to form a solution, so that the final amount of hydrolyzed cellulose ester is about 3 to 50 weight percent, based on total solids wherein the hydrolyzed cellulose ester has a hydroxyl content of at least 3 weight percent based on the unit molecular weight percent of the hydrolyzed cellulose ester; and (2) vigorously mixing water into said solution to form a dispersion wherein the mixing and amount of water are sufficient to render the dispersion usable in coating applications;

wherein about 0 to 10 weight percent surfactant, based on total solids, is present in the solution prior to step (2) and about 40 to 95 weight percent acrylic resin, based on total solids, is present in the dispersion and having free acid functionality that is at least partially neutralized prior to contacting with water.

11. The process according to claim 10 wherein said hydrolyzed cellulose ester is dissolved into said organic solvent prior to combining with the acrylic resin.

12. The process according to claim 10 wherein steps (1) and (2) are carried out at a temperature of about 25° to 100° C. at a time between about 5 minutes and 2 hours.

* * * * *

UNITED STATES PATENT AND TRADEMARK OFFICE
CERTIFICATE OF CORRECTION

PATENT NO. : 5,334,638
DATED : August 2, 1994
INVENTOR(S) : Chung M. Kuo et al.

It is certified that error appears in the above-indentified patent and that said Letters Patent is hereby corrected as shown below:

Column 9, line 13 (Claim 7, line 1), "claim " should be --- claim 6 --- .

Signed and Sealed this

Twenty-eight Day of March, 1995

Attest:

BRUCE LEHMAN

Attesting Officer    Commissioner of Patents and Trademarks